(12) United States Patent
Yano et al.

(10) Patent No.: US 8,756,964 B2
(45) Date of Patent: Jun. 24, 2014

(54) CENTRALIZED UNLOCKING OPERATION DEVICE

(75) Inventors: Hitoshi Yano, Miyazaki (JP); Nobuyuki Satou, Miyazaki (JP); Hayato Wakai, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 13/989,668

(22) PCT Filed: Jul. 26, 2011

(86) PCT No.: PCT/JP2011/066908
§ 371 (c)(1),
(2), (4) Date: Jul. 12, 2013

(87) PCT Pub. No.: WO2012/086252
PCT Pub. Date: Jun. 28, 2012

(65) Prior Publication Data
US 2013/0283869 A1   Oct. 31, 2013

(30) Foreign Application Priority Data
Dec. 22, 2010 (JP) ................................ 2010-286597

(51) Int. Cl.
*E05B 17/04* (2006.01)
(52) U.S. Cl.
USPC ............... 70/379 R; 70/264; 70/373; 70/380; 70/422; 70/492; 70/DIG. 36; 70/DIG. 42; 70/DIG. 62; 70/DIG. 63
(58) Field of Classification Search
CPC ..... E05B 17/04; E05B 17/041; E05B 17/047; E05B 17/22; E05B 9/04
USPC ............ 70/379 R, 379 A, 380, 381, 391, 422, 70/256, 262–266, 372, 373, 375, DIG. 36, 70/DIG. 42, DIG. 62, DIG. 52, DIG. 53, 70/DIG. 54, DIG. 55, DIG. 63, 492; 292/DIG. 52, DIG. 61, DIG. 62
See application file for complete search history.

(56) References Cited

U.S. PATENT DOCUMENTS 4,100,774 A * 7/1978 Solovieff et al. ............... 70/380
4,385,510 A * 5/1983 Harper ............................ 70/492

(Continued)

FOREIGN PATENT DOCUMENTS

JP          4-8211 Y2    3/1992
JP    2008-50829 A       3/2008

*Primary Examiner* — Lloyd Gall
(74) *Attorney, Agent, or Firm* — Arent Fox LLP

(57) ABSTRACT

A centralized unlocking operation device is provided in which a first operating arm pivots in response to a rotor being pivoted from a neutral position in a forward direction, and a second operating arm pivots in response to the rotor being pivoted from the neutral position in a reverse direction, wherein a first pressing face (38) that abuts against and imposes a pressing force on a first pressure-receiving part (35) of the first operating arm (33) when the rotor (15) is pivoted from the neutral position to the first operating position side and a second pressing face (39) that abuts against and imposes a pressing force on a second pressure-receiving part (36) of the second operating arm (34) when the rotor (15) is pivoted from the neutral position to the second operating position side are formed on a cam part (37) provided on the rotor (15), and the spring (32) is provided between the first and second operating arms (33, 34) so as to urge the first and second operating arms (33, 34) in a direction in which the first and second pressure-receiving parts (35, 36) abut against the first and second pressing faces (38, 39). This enables confirmation of whether or not two operating arms have returned to their original positions after a pivoting operation to be easily carried out from the outside.

2 Claims, 8 Drawing Sheets

(56) References Cited

U.S. PATENT DOCUMENTS

| | | | | |
|---|---|---|---|---|
| 4,530,222 A | * | 7/1985 | Harper | 73/304 R |
| 4,633,689 A | * | 1/1987 | Wolniak et al. | 70/379 R |
| 4,689,977 A | * | 9/1987 | Wolniak et al. | 70/379 R |
| 4,907,428 A | * | 3/1990 | Nakashima et al. | 70/264 |
| 5,050,410 A | * | 9/1991 | Claar et al. | 70/237 |
| 5,428,978 A | * | 7/1995 | Tsukano | 70/386 |
| 5,566,562 A | * | 10/1996 | Fujii | 70/277 |
| 5,630,331 A | * | 5/1997 | Miyamoto | 70/379 R |
| 5,638,712 A | * | 6/1997 | Kuroda | 70/268 |
| 5,775,147 A | * | 7/1998 | Wittwer | 70/379 R |
| 6,415,637 B1 | * | 7/2002 | Wittwer | 70/264 |
| 6,837,083 B2 | * | 1/2005 | Katagiri et al. | 70/379 R |

\* cited by examiner

CENTRALIZED UNLOCKING OPERATION DEVICE

CROSS-REFERENCED TO RELATED APPLICATIONS

This application is a National Stage entry of International Application PCT/JP2011/066908 filed Jul. 26, 2011, which claims priority to Japanese Application No. 2010-286597, filed Dec. 22, 2010, the disclosure of these prior applications are hereby incorporated in their entirety by reference.

TECHNICAL FIELD

The present invention relates to a centralized unlocking operation device that includes a fixed cylinder body, a rotor that is inserted into the cylinder body so as to be capable of pivoting between a neutral position and first and second operating positions set on opposite sides of the neutral position in response to a pivoting operation by a legitimate mechanical key, a spring that urges the rotor toward the neutral position side, a first operating arm that pivots together with the rotor so as to unlock a first locking mechanism when the rotor is pivoted from the neutral position to the first operating position side and that remains at rest when the rotor is pivoted from the neutral position to the second operating position side, and a second operating arm that pivots together with the rotor so as to unlock a second locking mechanism when the rotor is pivoted from the neutral position to the second operating position side and that remains at rest when the rotor is pivoted from the neutral position to the first operating position side.

BACKGROUND ART

An arrangement in which a first operating arm pivots in response to a rotor being pivoted from a neutral position in the forward direction by means of a legitimate mechanical key, locking of a lock part of a first opening/closing door thereby being released, and a second operating arm pivots in response to the rotor being pivoted from the neutral position in the reverse direction by means of a legitimate mechanical key, locking of a lock part of a second opening/closing door thereby being released is known from Patent Document 1, and in this arrangement first and second engagement steps are provided at an interval of 180 degrees from each other on the outer periphery of a shaft part coaxially and integrally provided with the rotor, the first operating arm is provided with an engagement projection that engages with the first engagement step when the shaft part rotates forward and a first fitting hole into which the shaft part is fitted with play so as to allow relative rotation of the shaft part in the reverse direction, the second operating arm is provided with an engagement projection that engages with the second engagement step when the shaft part rotates in reverse and a second fitting hole into which the shaft part is fitted with play so as to allow relative rotation of the shaft part in the forward direction, and a spring urging the rotor to the neutral position is provided between the cylinder body and the rotor.

RELATED ART DOCUMENTS

Patent Document

Patent Document 1: Japanese Utility Model Application Laid open Publication No. 4-8211

SUMMARY OF THE INVENTION

Problems to be Solved by the Invention

However, in the arrangement disclosed in Patent Document 1 above, the spring force of the spring acts on the rotor, but the spring force does not act on the first and second operating arms, and only an urging force from the lock part side acts in a return direction on the first and second operating arms. Because of this, even if the rotor is returned to the neutral position by means of the spring force after a pivoting operation of the rotor from the neutral position to any of the forward and reverse directions, there is a possibility that the operating arm will remain at the operating position due to a factor on the lock part side, and since even in such a state the rotor has returned to the neutral position, it is impossible to confirm from the outside that the operating arm has not returned to the original position.

The present invention has been accomplished in light of such circumstances, and it is an object thereof to provide a centralized unlocking operation device that enables confirmation of whether or not two operating arms have returned to their original positions after a pivoting operation to be easily carried out from the outside.

Means for Solving the Problems

In order to attain the above object, according to a first aspect of the present invention, there is provided a centralized unlocking operation device comprising a fixed cylinder body, a rotor that is inserted into the cylinder body so as to be capable of pivoting between a neutral position and first and second operating positions set on opposite sides of the neutral position in response to a pivoting operation by a legitimate mechanical key, a spring that urges the rotor toward the neutral position side, a first operating arm that pivots together with the rotor so as to unlock a first locking mechanism when the rotor is pivoted from the neutral position to the first operating position side and that remains at rest when the rotor is pivoted from the neutral position to the second operating position side, and a second operating arm that pivots together with the rotor so as to unlock a second locking mechanism when the rotor is pivoted from the neutral position to the second operating position side and that remains at rest when the rotor is pivoted from the neutral position to the first operating position side, characterized in that the first operating arm is provided with a first pressure-receiving part, the second operating arm is provided with a second pressure-receiving part, a first pressing face that abuts against and imposes a pressing force on the first pressure-receiving part when the rotor is pivoted from the neutral position to the first operating position side and a second pressing face that abuts against and imposes a pressing force on the second pressure-receiving part when the rotor is pivoted from the neutral position to the second operating position side are formed on a cam part provided on the rotor so as to have a shape that avoids abutment against the second pressure-receiving part when the rotor is pivoted from the neutral position to the first operating position side and avoids abutment against the first pressure-receiving part when the rotor is pivoted from the neutral position to the second operating position side, the spring is provided between the first and second operating arms so as to urge the first and second operating arms in a direction in which the first pressure-receiving part abuts against the first pressing face and the second pressure-receiving part abuts against the second pressing face, and the cylinder body is provided with a first restricting part that abuts against the first pressure-receiving part from the same side as the first pressing face when the rotor is at the neutral position and a second restricting part that abuts against the second pressure-receiving part from the same side as the second pressing face when the rotor is at the neutral position.

Further, according to a second aspect of the present invention, in addition to the first aspect, the first operating arm comprises a first cylindrical part, the second operating arm comprises a second cylindrical part, the first cylindrical part and the second cylindrical part are disposed coaxially with the rotor such that part of the second cylindrical part is relatively pivotably fitted into the first cylindrical part, and the spring is housed within the first cylindrical part.

Effects of the Invention

In accordance with the first aspect of the present invention, in a state in which the rotor is at the neutral position the first and second pressing faces of the cam part provided on the rotor abut against the first pressure-receiving part of the first operating arm and the second pressure-receiving part of the second operating arm, and the spring urging the rotor toward the neutral position side is provided between the first and second operating arms so as to urge the first and second operating arms in a direction in which the first pressure-receiving part abuts against the first pressing face and the second pressure-receiving part abuts against the second pressing face; since in a state in which one of the first and second pressure-receiving parts is pushed by means of one of the first and second pressing faces due to pivoting of the rotor, the spring force of the spring remains acting on one of the first and second operating arms toward the side on which it returns to its original position, and the spring force in the return direction acts on the rotor from one of the first and second pressure-receiving parts via the cam part, if the pivoting force acting on the rotor is released, the pivoted operating arm, together with the rotor, return to the neutral position, which is restricted by one of the first and second restricting parts, and since the pivoting position of the operating arm and the pivoting position of the rotor, that is, the mechanical key, coincide with each other, it can easily be confirmed from the outside that the operating arm has returned to its original position. If the operating arm does not return, a state is attained in which a spring force does not act on the cam part of the rotor, and the mechanical key is not returned to the original neutral position by means of the spring force; even if it returns, since no spring force acts thereon, pivoting of the mechanical key and the rotor becomes free and they can rattle while pivoting, and it is thereby possible to determine easily that the operating arm has not returned to its original neutral position.

Furthermore, in accordance with the second aspect of the present invention, since part of the second cylindrical part of the second operating arm is fitted relatively pivotably into the first cylindrical part of the first operating arm, and the spring is housed within the first cylindrical part, it is possible to suppress the ingress of rain water or dirt and dust onto the spring, thus preventing the spring from becoming rusty or dirt and dust from being caught by the spring and thereby making the operation of the spring smooth and improving its durability.

EXPLANATION OF REFERENCE NUMERALS AND SYMBOLS

Figure 1:
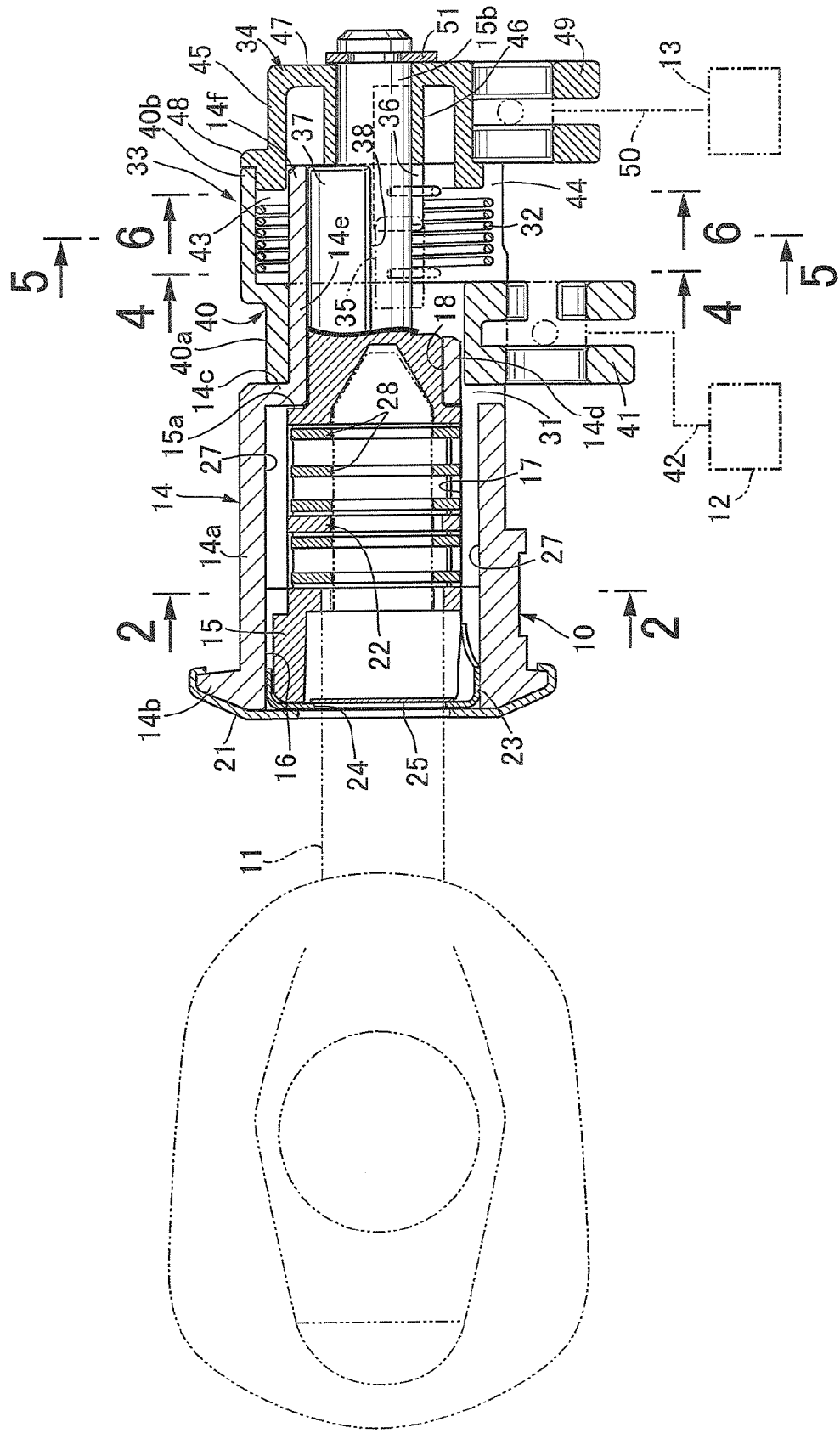
FIG. 1 is a vertical sectional view of a centralized unlocking operation device. (first embodiment)

11 Mechanical key
12 First locking mechanism
13 Second locking mechanism
14 Cylinder body
15 Rotor
32 Spring
33 First operating atm
34 Second operating arm
35 First pressure-receiving part
36 Second pressure-receiving part
37 Cam part
38 First pressing face
39 Second pressing face
40 First cylindrical part
45 Second cylindrical part
55 First restricting part
56 Second restricting part

MODE FOR CARRYING OUT THE INVENTION

A mode for carrying out the present invention is explained below by reference to FIG. 1 to FIG. 8.

Embodiment 1

First, in FIG. 1, this centralized unlocking operation device has a cylinder lock 10 and is provided on, for example, a motorcycle; inserting a legitimate mechanical key 11 into the cylinder lock 10 and pivoting it enables a first locking mechanism 12 for maintaining a state in which for example a riding seat covering a storage box from above is closed and a second locking mechanism 13 for maintaining for example a state in which a cap cover for a fuel tank is closed to be unlocked.

Figure 2:
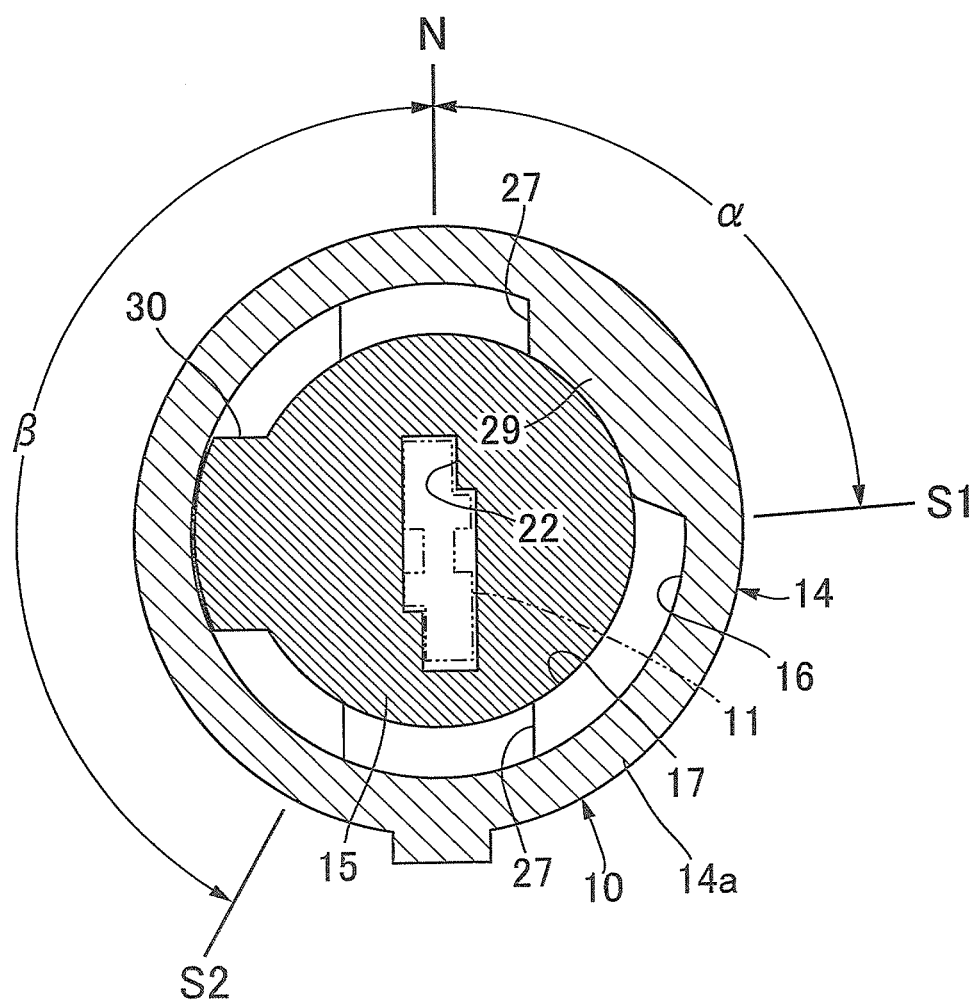
FIG. 2 is a sectional view along line 2-2 in FIG. 1. (first embodiment)

Referring in addition to FIG. 2, the cylinder lock 10 has settings of a neutral position N and first and second operating positions S1 and S2 on opposite sides thereof. The first operating position S1 is set at a position with an angle α, for example, 90 degrees, in the clockwise direction from the neutral position N and the second operating position S2 is set at a position with an angle β, for example, 160 degrees, in the anticlockwise direction from the neutral position N. Pivoting the legitimate mechanical key 11 inserted into the cylinder lock 10 from the neutral position N to the first operating position S1 allows the first locking mechanism 12 to be unlocked and pivoting the mechanical key 11 from the neutral position N to the second operating position S2 allows the second locking mechanism 13 to be unlocked.

Figure 3:
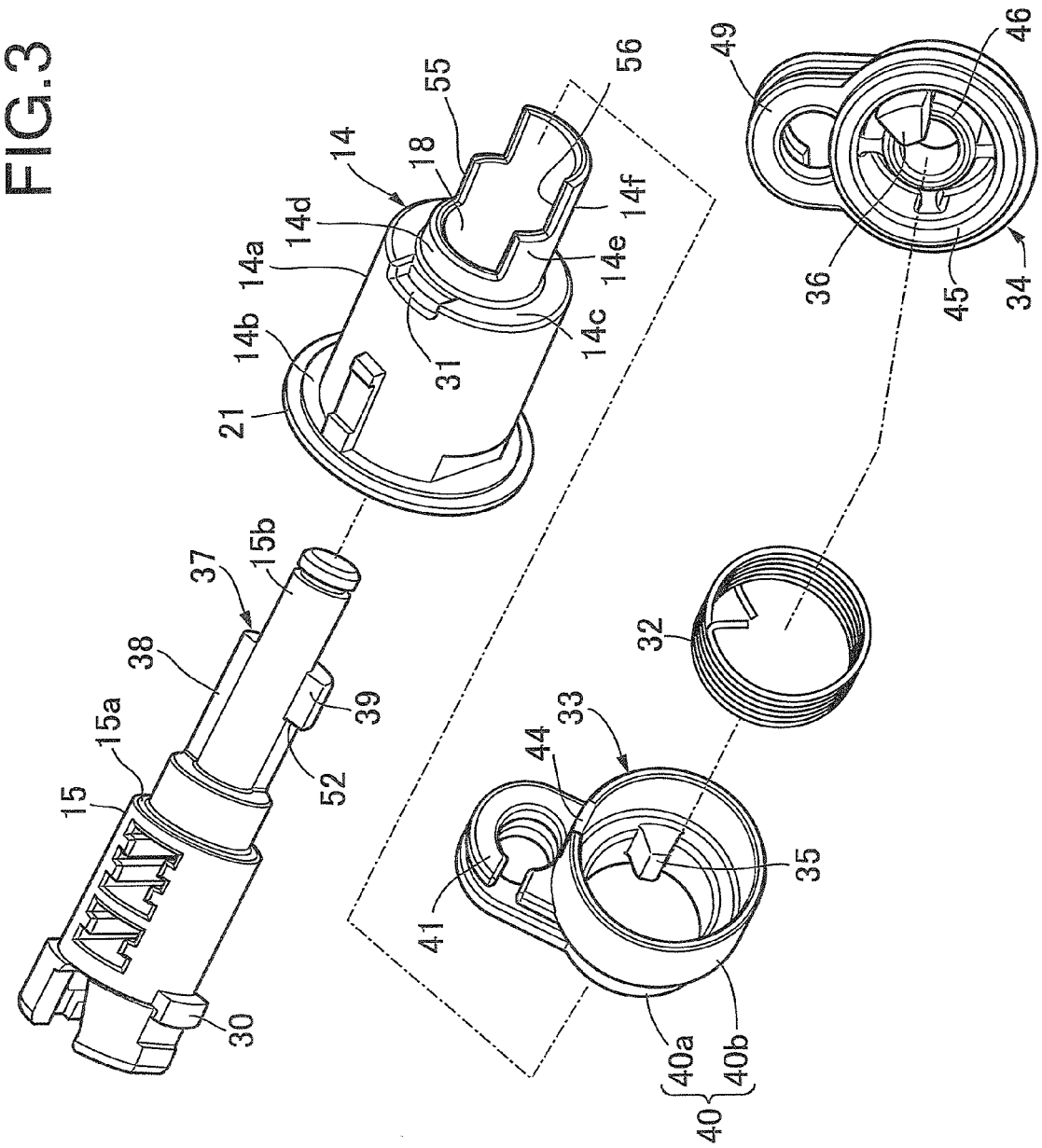
FIG. 3 is an exploded perspective view of the centralized unlocking operation device from an obliquely downward direction. (first embodiment)

Referring in addition to FIG. 3, the cylinder lock 10 includes a fixed cylinder body 14, which is formed into a substantially cylindrical shape, and a rotor 15 inserted into the cylinder body 14, the rotor 15 being capable of pivoting between the neutral position N and the first and second operating positions S1 and S2 in response to a pivoting operation by the legitimate mechanical key 11.

The cylinder body 14 is formed so as to integrally have a large diameter cylindrical portion 14a, a collar portion 14b that protrudes in a radially outward direction from the front end (the left end in FIG. 1) of the large diameter cylindrical portion 14a, a restricting collar portion 14c that protrudes in a radially inward direction from the rear end of the large diameter cylindrical portion 14a, a small diameter cylindrical portion 14d that is disposed so as to be coaxial with the large diameter cylindrical portion 14a while having its front end connected to the inner periphery of the restricting collar portion 14c, a large arc portion 14e that is flush with an upper part of a rear end part of the small diameter cylindrical portion 14d, and a small arc portion 14f that is flush with a rear end part of the large arc portion 14e over a smaller angular range than the large arc portion 14e.

Formed within the large diameter cylindrical portion 14a of the cylinder body 14 are a first cylinder hole 16 having its front end open and a second cylinder hole 17 formed so as to have a smaller diameter than that of the first cylinder hole 16 and be coaxially connected to the rear end of the first cylinder hole 16, and formed in the small diameter cylindrical portion 14d is a third cylinder hole 18 formed so as to have smaller diameter than that of the second cylinder hole 17 and be coaxially connected to the rear end of the second cylinder hole 17.

Fixed to a front end part of the cylinder body 14 is a ring-shaped outer cap 21 with an inner peripheral part thereof protruding further inward than the front end of the first cylinder hole 16 and its outer periphery being joined by swaging to the outer periphery of the collar portion 14b.

The rotor 15 is pivotably inserted into the first to third cylinder holes 16 to 18 while having an annular sliding contact step 15a that is in sliding contact with the restricting collar portion 14c of the cylinder body 14 from the front, and this rotor 15 is provided with a bottomed key hole 22, into which the mechanical key 11 can be inserted, that opens at the front end of the rotor 15. Fitted around a front end part of the rotor 15 is an inner cap 23 having an opening 24 that corresponds to the key hole 22, and pivotably mounted on the inner cap 23 is a cover 25 that enables the mechanical key 11 to be inserted into the key hole 22, the cover 25 being spring-biased toward the side on which the opening 24 is closed. The rotor 15 is thus inserted into the cylinder body 14 while its axial movement is restricted by the outer cap 21 and the restricting collar portion 14c.

A pair of engagement grooves 27 and 27 spaced in the peripheral direction are provided in the large diameter cylindrical portion 14a of the cylinder body 14 so as to be flush with the inner peripheral face of the first cylinder hole 16, the engagement grooves 27 and 27 opening on the inner periphery of the second cylinder hole 17 and extending in the axial direction, and in this embodiment the engagement grooves 27 are provided in the cylinder body 14 so as to be disposed so as to be separated in the vertical direction of the cylinder body 14 in a state in which it is fixed to the motorcycle. On the other hand, a plurality of tumblers 28 that can engage with the engagement grooves 27 are disposed on the rotor 15 while being resiliently urged in a direction in which they engage with the engagement grooves 27, and each of the tumblers 28 is displaced to the side on which it releases engagement with the engagement grooves 27 in response to insertion of the legitimate mechanical key 11 into the key hole 22, thereby enabling the rotor 15 to be pivoted.

Moreover, a restricting protrusion 29 is provided integrally with the cylinder body 14 in front of a part where the first and second cylinder holes 16 and 17 are connected, the restricting protrusion 29 protruding inwardly from the inner periphery of the first cylinder hole 16. A protrusion 30 is projectingly provided integrally with the outer periphery of the rotor 15 within the first cylinder hole 16, the protrusion 30 determining the first operating position S1 for the rotor 15 by abutting against one side face in the peripheral direction of the restricting protrusion 29 and determining the second operating position S2 for the rotor 15 by abutting against the other side face in the peripheral direction of the restricting protrusion 29.

Furthermore, a first drain hole 31 is provided in a lower part of the restricting collar portion 14c of the cylinder body 14 so as to communicate with the engagement groove 27 that is the lower of the two engagement grooves 27, in order to drain the interior of the large diameter cylindrical portion 14a.

The centralized unlocking operation device includes, in addition to the cylinder body 14 and the rotor 15, a spring 32 urging the rotor 15 toward the neutral position N side, a first operating arm 33 that pivots together with the rotor 15 so as to unlock the first locking mechanism 12 when the rotor 15 is pivoted from the neutral position N to the first operating position S1 side and that remains at rest when the rotor 15 is pivoted from the neutral position N to the second operating position S2 side, and a second operating arm 34 that pivots together with the rotor 15 so as to unlock the second locking mechanism 13 when the rotor 15 is pivoted from the neutral position N to the second operating position S2 side and that remains at rest when the rotor 15 is pivoted from the neutral position N to the first operating position S1 side.

The first operating arm 33 is provided with a first pressure-receiving part 35, and the second operating arm 34 is provided with a second pressure-receiving part 36. On the other hand, the rotor 15 is provided with a cam part 37. Formed on the cam part 37 are a first pressing face 38 that abuts against the first pressure-receiving part 35 and imposes a pressing force thereon when the rotor 15 is pivoted from the neutral position N to the first operating position S1 side and a second pressing face 39 that abuts against the second pressure-receiving part 36 and imposes a pressing force thereon when the rotor 15 is pivoted from the neutral position to the second operating position S2 side.

A drive shaft portion 15b is connectedly provided coaxially and integrally with a rear end part of the rotor 15, the drive shaft portion 15b extending rearward within the large arc portion 14e and the small arc portion 14f of the cylinder body 14. The cam part 37 is provided on the outer periphery of the drive shaft portion 15b along the axial length of the drive shaft portion 15b, the cam part 37 having its outer periphery in sliding contact with the inner peripheries of the large arc portion 14e and the small arc portion 14f. The first and second pressing faces 38 and 39 are formed on the cam part 37 so as to face in opposite directions to each other along the peripheral direction of the drive shaft portion 15b.

Figure 4:
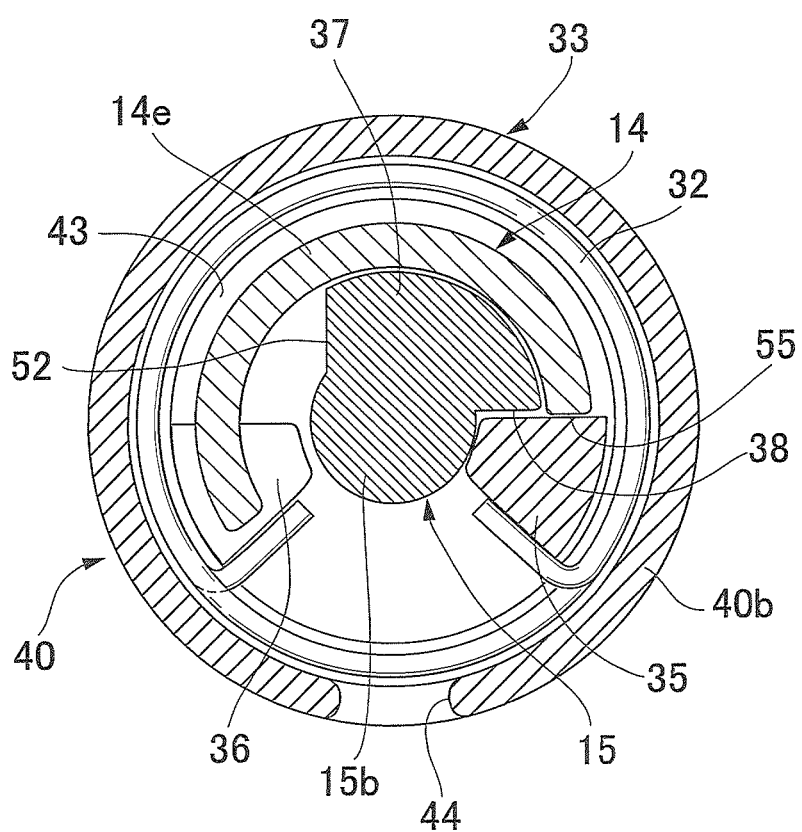
FIG. 4 is a sectional view along line 4-4 in FIG. 1. (first embodiment)
Figure 5:
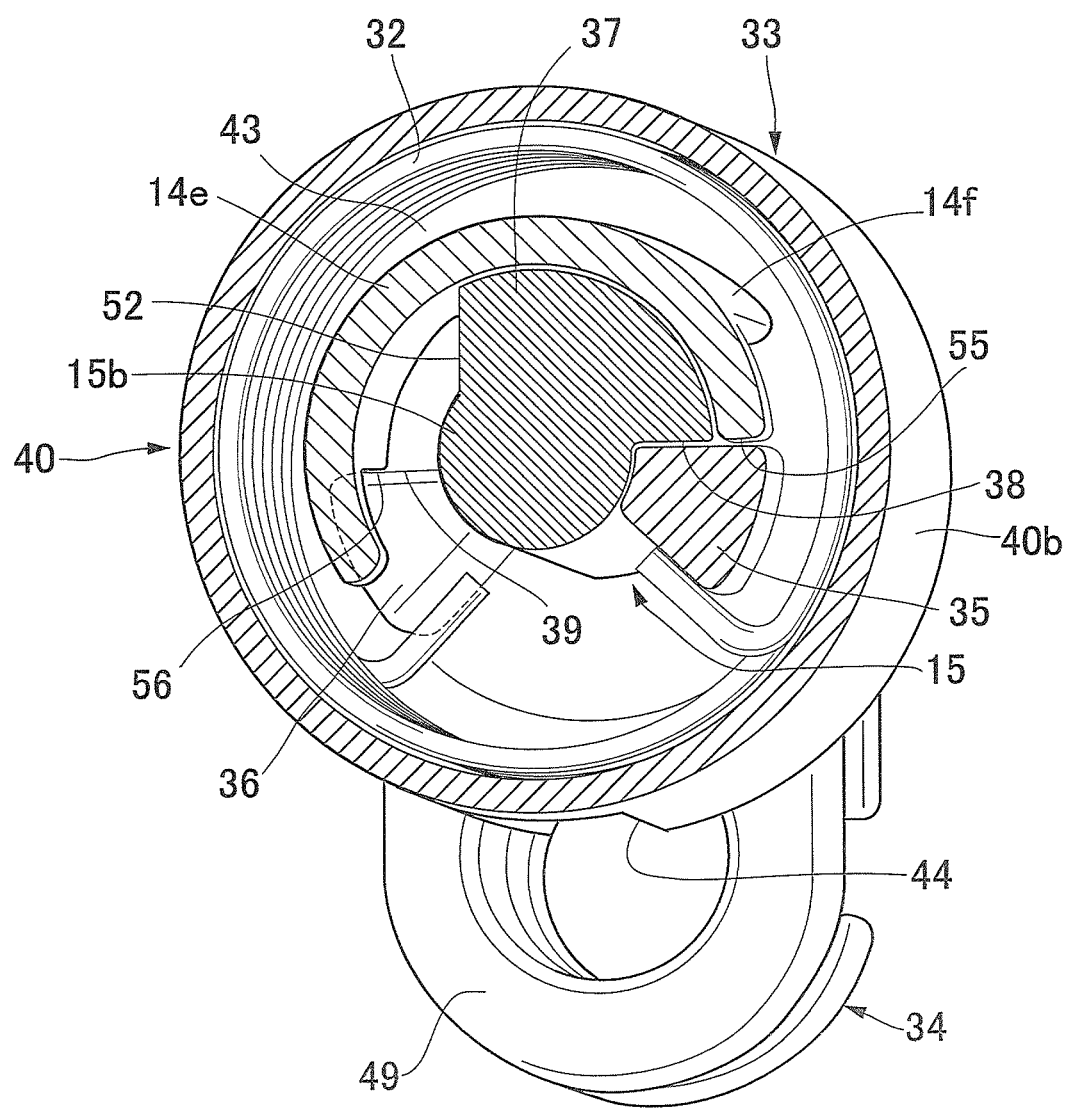
FIG. 5 is a transverse perspective view of a rear portion of the centralized unlocking operation device with respect to line 5-5 in FIG. 1 from the front left. (first embodiment)

Referring in addition to FIG. 4 and FIG. 5, the first operating arm 33 is formed so as to integrally have a first cylindrical part 40 that is formed into a stepped cylindrical shape having a small diameter cylindrical portion 40a and a large diameter cylindrical portion 40b formed so as to have a larger diameter than that of the small diameter cylindrical portion 40a, and a first arm part 41 that protrudes in a radially outward direction from the small diameter cylindrical portion 40*a* of the first cylindrical part 40, transmission means such as a wire 42 connected to the first locking mechanism 12 being linked to an extremity part of the first arm part 41.

The small diameter cylindrical portion 40*a* of the first cylindrical part 40 is formed so as to coaxially surround the small diameter cylindrical portion 14*d* and the large arc portion 14*e* so as to have the small diameter cylindrical portion 14*d* and part of the large arc portion 14*e* of the cylinder body 14 slidably fitted thereinto, and the front end of the small diameter cylindrical portion 40*a* is in sliding contact with the restricting collar portion 14*c* of the cylinder body 14. Furthermore, the large diameter cylindrical portion 40*b* of the first cylindrical part 40 is formed so as to have a larger diameter than those of the large arc portion 14*e* and the small arc portion 14*f* while forming a gap 43 between itself and the outer peripheries of the small arc portion 14*f* and the rest of the large arc portion 14*e* of the cylinder body 14, and a slit-shaped second drain hole 44 extending in the axial direction is provided in a lower part of the large diameter cylindrical portion 40*b*.

The first pressure-receiving part 35 is provided integrally with the first operating arm 33 so as to protrude in a radially inward direction from the inner periphery of the small diameter cylindrical portion 40*a* of the first cylindrical part 40 of the first operating arm 33 at a position, offset from the area where the cam part 37 is provided, on the outer periphery of the drive shaft portion 15*b*, and part of the first pressure-receiving part 35 extends toward the large diameter cylindrical portion 40*b* side of the first cylindrical part 40 so as to be positioned between opposite ends in the peripheral direction of the large arc portion 14*e*. The first pressure-receiving part 35 can abut against the first pressing face 38 formed on a side face on one side of the cam part 37 along the peripheral direction of the drive shaft portion 15*b*.

Figure 6:
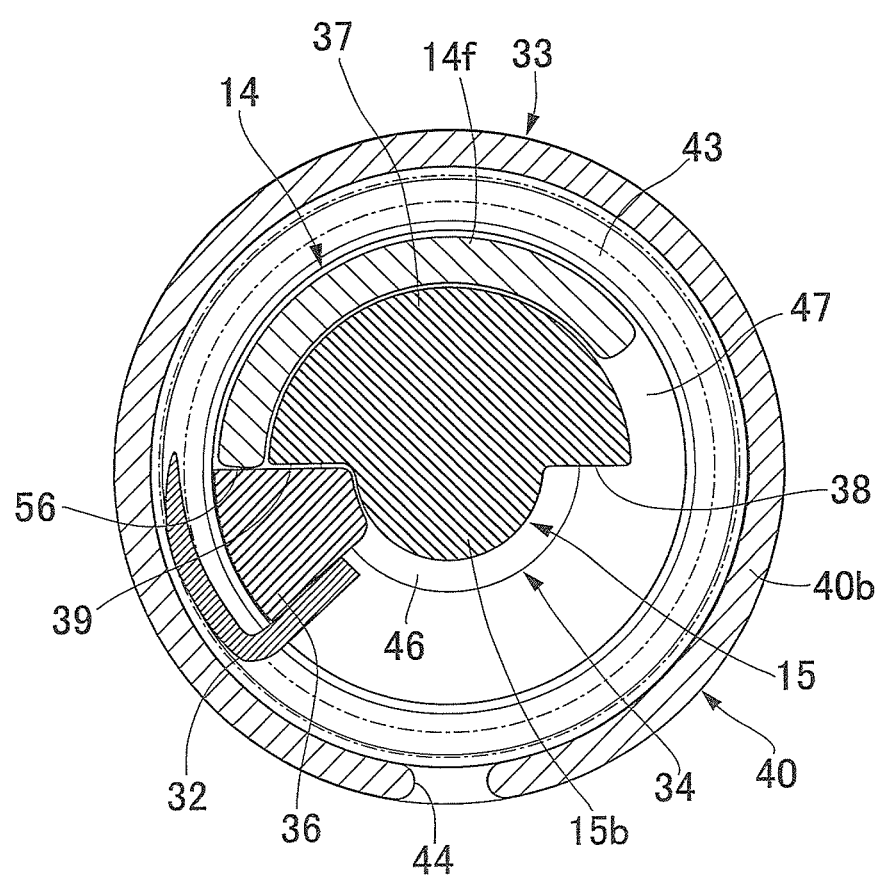
FIG. 6 is a sectional view along line 6-6 in FIG. 1. (first embodiment)

Referring in addition to FIG. 6, the second operating arm 34 is formed so as to integrally have a second cylindrical part 45 that has its front end part relatively pivotably fitted into a rear part of the large diameter cylindrical portion 40*b* of the first cylindrical part 40, a support cylindrical part 46 that is coaxially disposed within the second cylindrical part 45 so that the drive shaft portion 15*b* extends coaxially therethrough, an end wall part 47 that has a ring plate shape joining the rear ends of the second cylindrical part 45 and the support cylindrical part 46, a collar 48 that extends in a radially outward direction from a front part of the second cylindrical part 45 so as to be in sliding contact with the rear end of the large diameter cylindrical portion 40*b* of the first cylindrical part 40, and a second arm part 49 that extends in a radially outward direction from the second cylindrical part 45, transmission means such as a wire 50 connected to the second locking mechanism 13 being linked to an extremity part of the second arm part 49.

A stopper ring 51 is fitted around a portion, projecting outward from the rear end of the support cylindrical part 46 of the second operating arm 34, of the drive shaft portion 15*b*, the stopper ring 51 abutting against and engaging with an outer face of the end wall part 47. That is, the first and second operating arms 33 and 34 are pivotably support by the cylinder body 14 and the drive shaft portion 15*b* such that their axial positions are restricted by the restricting collar portion 14*c* of the cylinder body 14 and the stopper ring 51 fitted around the drive shaft portion 15*b*.

The second pressure-receiving part 36 is provided integrally with the second operating arm 34 so as to extend between the inner periphery of the second cylindrical part 45 and the outer periphery of the support cylindrical part 46 at a position, offset from the area where the cam part 37 is provided, of the outer periphery of the drive shaft portion 15*b*, and part of the second pressure-receiving part 36 extends toward the large diameter cylindrical portion 40*b* side of the first cylindrical part 40 so as to be positioned between opposite ends in the peripheral direction of the small arc portion 14*f*. The second pressure-receiving part 36 can abut against the second pressing face 39 formed on a side face on the other side of the cam part 37 along the peripheral direction of the drive shaft portion 15*b*.

The cam part 37 is formed so as to avoid abutment against the second pressure-receiving part 36 when the rotor 15 is pivoted from the neutral position N to the first operating position S1 side and avoid abutment against the first pressure-receiving part 35 when the rotor 15 is pivoted from the neutral position N to the second operating position S2 side, the second pressing face 39 is formed on a rear part of the cam part 37, and a cutout 52 is formed in the cam part 37 on a side forward of the second pressing face 39, the cutout 52 being formed so that abutment of the first pressure-receiving part 35 against the cam part 37 is avoided when the rotor 15 is pivoted from the neutral position N to the second operating position S2 side.

Furthermore, the spring 32, which urges the first and second operating arms 33 and 34 in a direction in which the first pressure-receiving part 35 abuts against the first pressing face 38 and the second pressure-receiving part 36 abuts against the second pressing face 39, is a torsion spring, is housed within the large diameter cylindrical portion 40*b* of the first cylindrical part 40 so as to be disposed in the gap 43, and is provided between the first pressure-receiving part 35 of the first operating arm 33 and the second pressure-receiving part 36 of the second operating arm 34.

Furthermore, a first restricting part 55 that abuts against the first pressure-receiving part 35 from the same side as the first pressing face 38 when the rotor 15 is at the neutral position N and a second restricting part 56 that abuts against the second pressure-receiving part 36 from the same side as the second pressing face 39 when the rotor 15 is at the neutral position N are provided on the cylinder body 14. The first restricting part 55 is formed at one end along the peripheral direction of the large arc portion 14*e* of the cylinder body 14, and the second restricting part 56 is formed at the other end along the peripheral direction of the small arc portion 14*f* of the cylinder body 14.

The operation of this embodiment is now explained. The first pressing face 38, which abuts against the first pressure-receiving part 35 of the first operating arm 33 and imposes a pressing force thereon when the rotor 15 is pivoted from the neutral position N to the first operating position S1 side, and the second pressing face 39, which abuts against the second pressure-receiving part 36 of the second operating arm 34 and imposes a pressing force thereon when the rotor 15 is pivoted from the neutral position N to the second operating position side, are formed on the cam part 37, which is provided on the drive shaft portion 15*b* of the rotor 15 so as to have a shape that avoids abutment against the second pressure-receiving part 36 when the rotor 15 is pivoted from the neutral position N to the first operating position S1 side and avoids abutment against the first pressure-receiving part 35 when the rotor 15 is pivoted from the neutral position N to the second operating position S2 side, the spring 32 is provided between the first and second operating arms 33 and 34 so as to urge the first and second operating arms 33 and 34 in a direction in which the first pressure-receiving part 35 abuts against the first pressing face 38 and the second pressure-receiving part 36 abuts against the second pressing face 39, and the first restricting part 55, which abuts against the first pressure-receiving part 35 from the same side as the first pressing face 38 when the rotor 15 is at the neutral position N, and the second restricting part 56, which abuts against the second pressure-receiving part 36 from the same side as the second pressing face 39 when the rotor 15 is at the neutral position N, are provided on the cylinder body 14.

Figure 7:
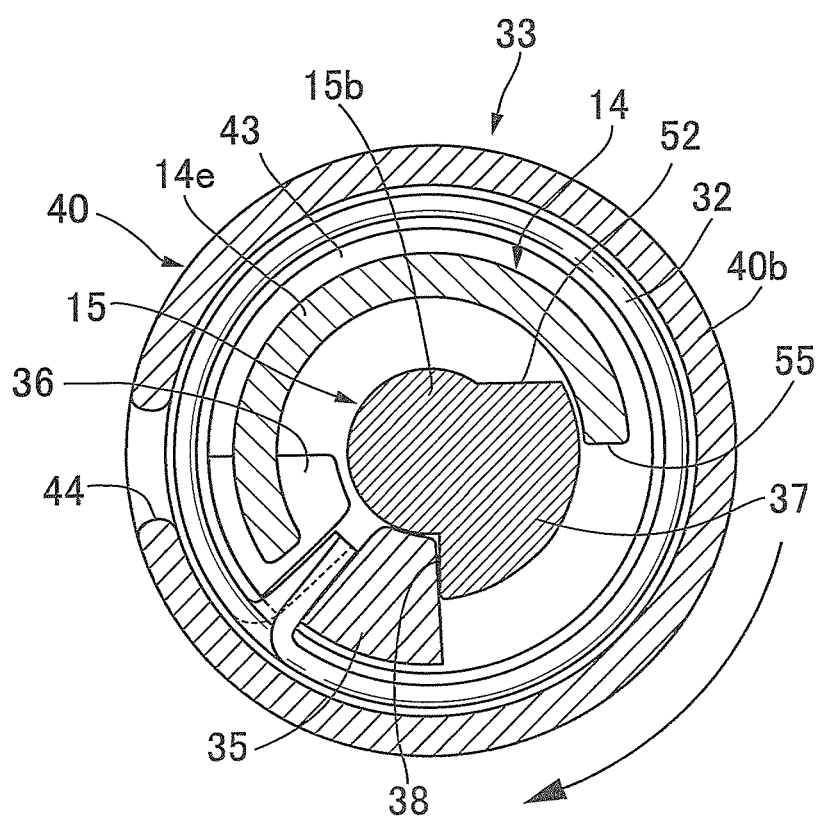
FIG. 7 is a sectional view, corresponding to FIG. 4, in a state in which a rotor has been pivoted to a first operating position. (first embodiment)

Therefore, as shown in FIG. 7, when the rotor 15 is pivoted from the neutral position N to the first operating position S1, since in a state in which the first pressure-receiving part 35 is pushed by means of the first pressing face 38, the spring force of the spring 32 remains acting on the first operating arm 33 toward the side on which it returns to its original position, and the spring force in the return direction acts on the rotor 15 from the first pressure-receiving part 35 via the cam part 37, if the force pivoting the rotor 15 by the mechanical key 11 is released, the rotor 15 returns to the neutral position at which the first pressure-receiving part 35 abuts against the first restricting part 55 provided on the cylinder body 14.

Figure 8:
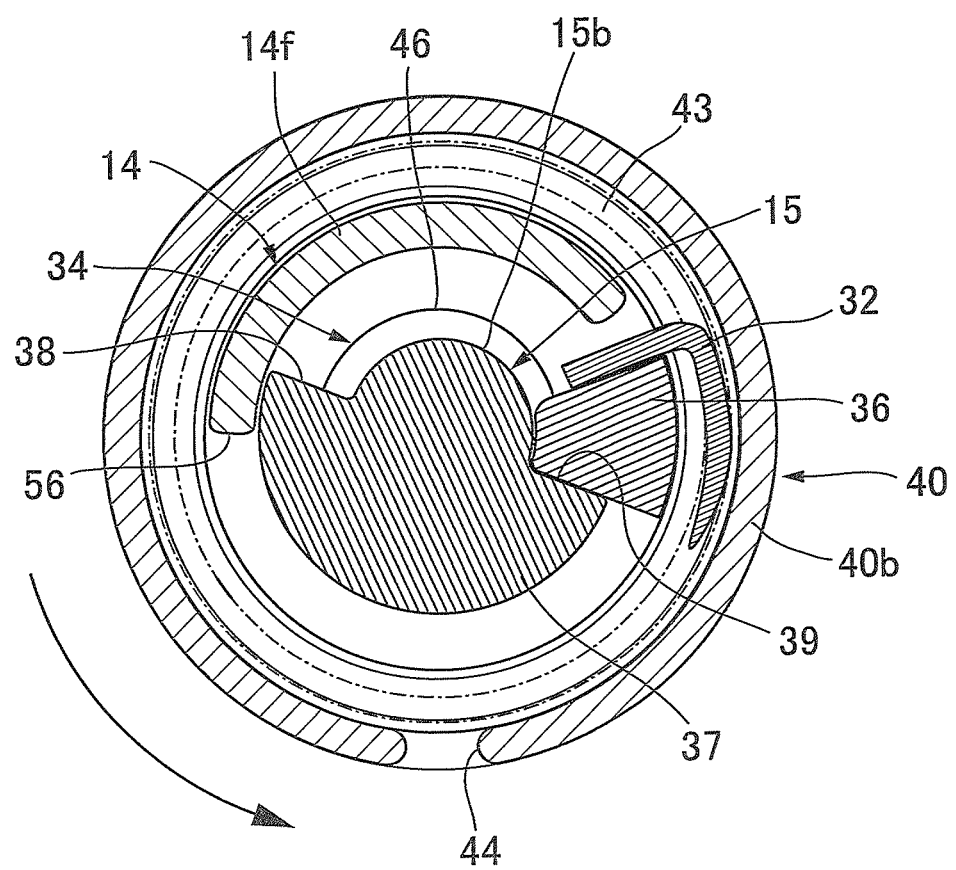
FIG. 8 is a sectional view, corresponding to FIG. 6, in a state in which the rotor has been pivoted to a second operating position. (first embodiment)

Furthermore, as shown in FIG. 8, when the rotor 15 is pivoted from the neutral position N to the second operating position S2, since in a state in which the second pressure-receiving part 36 is pushed by the second pressing face 39, the spring force of the spring 32 remains acting on the second operating arm 34 toward the side on which it returns to its original position, and the spring force in the return direction acts on the rotor 15 from the second pressure-receiving part 36 via the cam part 37, if the force pivoting the rotor 15 by the mechanical key 11 is released, the rotor 15 returns to the neutral position at which the second pressure-receiving part 36 abuts against the second restricting part 56 provided on the cylinder body 14.

That is, since in a state in which one of the first and second pressure-receiving parts 35 and 36 is pushed by means of one of the first and second pressing faces 38 and 39 due to pivoting of the rotor 15, the spring force of the spring 32 remains acting on one of the first and second operating arms 33 and 34 toward the side on which it returns to its original position, and the spring force in the return direction acts on the rotor 15 from one of the first and second pressure-receiving parts 35 and 36 via the cam part 37, if the pivoting force acting on the rotor 15 is released, the rotor 15 and the pivoted operating arm 33, 34 return to the neutral position, which is restricted by one of the first and second restricting parts 55 and 56, and since the pivoting position of the operating arm 33, 34 and the pivoting position of the rotor 15, that is, the mechanical key 11, coincide with each other, it can easily be confirmed from the outside that the operating arm 33, 34 has returned to its original position. This enables confirmation that the first locking mechanism 12 and the second locking mechanism 13 are operating normally and have returned to their original positions to be carried out.

If by some chance the operating arms 33 and 34 do not return, a state is attained in which a spring force does not act on the cam part 37 of the rotor 15, the mechanical key 11 inserted into the rotor 15 is not returned to the neutral position together with the rotor 15 by means of the spring force, and the mechanical key 11 cannot be pulled out from the cylinder lock 10; even if the mechanical key 11 returns together with the rotor 15, since no spring force acts thereon, pivoting of the mechanical key 11 and the rotor 15 becomes free and they can rattle while pivoting, and it is thereby possible to determine easily that the operating arms 33 and 34 have not returned to the original neutral positions.

Moreover, since the first cylindrical part 40 of the first operating arm 33 and the second cylindrical part 45 of the second operating arm 34 are disposed coaxially with the rotor 15 such that part of the second cylindrical part 45 is fitted relatively pivotably into the first cylindrical part 40, and the spring 32 is housed within the first cylindrical part 40, it is possible to suppress the ingress of rain water or dirt and dust onto the spring 32, thus preventing the spring 32 from becoming rusty or dirt and dust from being caught by the spring 32 and thereby making the operation of the spring 32 smooth and improving its durability.

An embodiment of the present invention is explained above, but the present invention is not limited to the embodiment and may be modified in a variety of ways as long as the modifications do not depart from the spirit and scope thereof.

The invention claimed is:

1. A centralized unlocking operation device comprising a fixed cylinder body (14), a rotor (15) that is inserted into the cylinder body (14) so as to be capable of pivoting between a neutral position and first and second operating positions set on opposite sides of the neutral position in response to a pivoting operation by a legitimate mechanical key (11), a spring (32) that urges the rotor (15) toward the neutral position, a first operating arm (33) that pivots together with the rotor (15) so as to unlock a first locking mechanism (12) when the rotor (15) is pivoted from the neutral position to the first operating position side and that remains at rest when the rotor (15) is pivoted from the neutral position to the second operating position side, and a second operating arm (34) that pivots together with the rotor (15) so as to unlock a second locking mechanism (13) when the rotor (15) is pivoted from the neutral position to the second operating position side and that remains at rest when the rotor (15) is pivoted from the neutral position to the first operating position side, characterized in that the first operating arm (33) is provided with a first pressure-receiving part (35), the second operating arm (34) is provided with a second pressure-receiving part (36), a first pressing face (38) that abuts against and imposes a pressing force on the first pressure-receiving part (35) when the rotor (15) is pivoted from the neutral position to the first operating position side and a second pressing face (39) that abuts against and imposes a pressing force on the second pressure-receiving part (36) when the rotor (15) is pivoted from the neutral position to the second operating position side are formed on a cam part (37) provided on the rotor (15) so as to have a shape that avoids abutment against the second pressure-receiving part (36) when the rotor (15) is pivoted from the neutral position to the first operating position side and avoids abutment against the first pressure-receiving part (35) when the rotor (15) is pivoted from the neutral position to the second operating position side, the spring (32) is provided between the first and second operating arms (33, 34) so as to urge the first and second operating arms (33, 34) in a direction in which the first pressure-receiving part (35) abuts against the first pressing face (38) and the second pressure-receiving part (36) abuts against the second pressing face (39), and the cylinder body (14) is provided with a first restricting part (55) that abuts against the first pressure-receiving part (35) from the same side as the first pressing face (38) when the rotor (15) is at the neutral position and a second restricting part (56) that abuts against the second pressure-receiving part (36) from the same side as the second pressing face (39) when the rotor (15) is at the neutral position.

2. The centralized unlocking operation device according to claim 1, wherein the first operating arm (33) comprises a first cylindrical part (40), the second operating arm (34) comprises a second cylindrical part (45), the first cylindrical part (40) and the second cylindrical part (45) are disposed coaxially with the rotor (15) such that part of the second cylindrical part (45) is relatively pivotably fitted into the first cylindrical part (40), and the spring (32) is housed within the first cylindrical part (40).

\* \* \* \* \*